US012784719B2

(12) United States Patent
Rein et al.

(10) Patent No.: US 12,784,719 B2
(45) Date of Patent: *Nov. 3, 2026

(54) SYSTEM AND METHOD FOR INCREASING ENERGY LEVEL OF SONGS

(71) Applicant: BELLEVUE INVESTMENTS GmbH & Co. KGaA, Berlin (DE)

(72) Inventors: Dieter Rein, Berlin (DE); Jurgen Jaron, Berlin (DE)

(73) Assignee: BELLEVUE Investments GmbH & Co. KGaA (DE)

( * ) Notice: Subject to any disclaimer, the term of this patent is extended or adjusted under 35 U.S.C. 154(b) by 911 days.

This patent is subject to a terminal disclaimer.

(21) Appl. No.: 18/078,197

(22) Filed: Dec. 9, 2022

(65) Prior Publication Data

US 2023/0188108 A1 Jun. 15, 2023

Related U.S. Application Data

(60) Provisional application No. 63/287,646, filed on Dec. 9, 2021.

(51) Int. Cl.
*G10H 1/00* (2006.01)

(52) U.S. Cl.
CPC ..... *G10H 1/0025* (2013.01); *G10H 2210/056* (2013.01); *G10H 2210/111* (2013.01); *G10H 2210/141* (2013.01); *G10H 2240/075* (2013.01); *G10H 2240/131* (2013.01); *G10H 2250/005* (2013.01)

(58) Field of Classification Search
CPC .......... G10H 1/0025; G10H 1/02; G10H 1/04; G10H 1/053; G10H 1/36; G10H 1/361; G10H 1/46; G10H 2210/005; G10H 2210/011; G10H 2210/031; G10H 2210/051; G10H 2210/056; G10H 2210/066; G10H 2210/101–111; G10H 2210/141; G10H 2240/005; G10H 2240/075; G10H 2240/121; G10H 2240/131–151; G10H 2240/325
See application file for complete search history.

(56) References Cited

U.S. PATENT DOCUMENTS

| | | | | |
|---|---|---|---|---|
| 7,642,444 B2 * | 1/2010 | Fujishima | G10H 1/0025 84/613 |
| 7,812,240 B2 * | 10/2010 | Streich | G06F 16/683 84/609 |
| 11,615,138 B2 * | 3/2023 | Rein | G10H 1/0025 84/600 |
| 12,347,409 B1 * | 7/2025 | Venti | G10H 1/0025 |
| 2017/0031650 A1 * | 2/2017 | Fraga | G16H 20/40 |

* cited by examiner

*Primary Examiner* — Christopher Uhlir
(74) *Attorney, Agent, or Firm* — Fellers, Snider, Blankenship, Bailey & Tippens, P.C.; Terry L. Watt

(57) ABSTRACT

According to a first embodiment, there is presented herein a method of increasing the energy level of a user-selected song in a loop-based music generation system. In one embodiment the algorithm is integrated into a music generation/song construction process and comprises of three different approaches, with one of the three being a hybrid version of the remaining approaches.

3 Claims, 7 Drawing Sheets

SYSTEM AND METHOD FOR INCREASING ENERGY LEVEL OF SONGS

CROSS REFERENCE TO RELATED APPLICATIONS

This application claims the benefit of U.S. Provisional Patent Application Ser. No. 63/287,646 filed on Dec. 9, 2021 and incorporates said provisional application by reference into this document as if fully set out at this point.

TECHNICAL FIELD

The instant invention relates generally to processing music works and, more particularly, methods of increasing the energy level of songs and automated adaptation of songs for video production.

BACKGROUND

Creation of a musical work has been a goal and dream of many people for as long as music has been around. However, a lack of knowledge of details regarding the intricacies of music styles, has prevented many from generating and writing music. As such, this endeavor has, for a very long time, been a privilege of people having the necessary knowledge and education.

With the advent of the personal computer and the widespread adoption of these devices in the home consumer market software, products have emerged that allow a user to create pleasing and useful musical compositions without having to know music theory or needing to understand music constructs such as measures, bars, harmonies, time signatures, key signatures, etc. These software products provide graphical user interfaces with a visual approach to song and music content that allow even novice users to focus on the creative process without being hampered by having to learn the intricacies of music generation.

In addition to increasing the accessibility of music generation, the content that is available and usable in the process of generating music has also been adapted to correspond to the directive of supplying an easy-to-use music generation approach. These sorts of programs typically provide a number of individual sound clips of compatible length, e.g., sound loops or just "loops", which can be selected and inserted into the multiple tracks of an on-screen graphical user interface as part of the process of music creation. With these sorts of software products, the task of music or song generation has come within reach of an expanded audience of users, who happily take advantage of the more simplified approach to music or song generation as compared with note-by-note composition. These software products have evolved over the years, gotten more sophisticated and more specialized and some have even been implemented on mobile devices.

The general approach to music or song generation provided by these software products has remained virtually unchanged, even though the processing power of the computing devices has increased and the types of devices that run this software has expanded on par with the changes in device distribution. That is, the conventional approach to music creation which has remained largely unchanged involves requiring the user to select individual pre-generated audio loops that represent different instruments (e.g., drums, bass, guitar, synthesizer, vocals, etc.), and arrange these loops in digital tracks to generate individual song parts, typically with a length of 4 or 8 measures, the goal being the generation of a full audio clip or song. Using this approach most users are able to generate one or two of these song parts with the help of an informative graphical user interface of a mobile or desktop-based software product according to their own taste and are therefore potentially able to generate individual verses and maybe the refrain of their own song.

The songs generated by the user manually or with the help of an automated system feature a static generated music item containing a fixed selection of audio loops stored in a specified song structure. Therefore, these songs are also fixed in terms of their content and also in terms of their features. That is, if the intent is to use the generated music work as a soundtrack in a video production these songs feature only one fixed energy level. That becomes an issue when it is desired to produce a musical work that is supposed to have musical impact on the listener that is comparable to the action in a video. In video production producers usually would benefit from having at least two individual energy versions of a music item that is to be utilized for the illustration of different video scenarios and differing content in the video material.

Thus, what is needed is a system and method for increasing the energy level of songs and music items in a loop-based music generation system.

Heretofore, as is well known in the media editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to a first embodiment, one method presented herein involves methods of increasing the energy level of a user-selected song in a loop-based music generation system. In one embodiment the algorithm is integrated into a music generation/song construction process and comprises of three different approaches, with one being a hybrid version of the other two approaches. The first approach is directed to exchanging loops that are a part of the song structure. The second approach is directed to increasing the song energy by adding loops to the song structure. The hybrid/third embodiment of the algorithm features a dynamic combination version of the previously mentioned approaches, wherein the instant invention preferably automatically selects a fitting approach from the three potential approaches for a particular user selected song.

It should be clear that an approach such as this would be a tremendous aid to the user and would additionally provide assistance in the development and the creation of professional songs with differing energy levels specified by the users. The often-frustrating trial and error process of finding and generating musical material that is fitting in dynamic and impact to a particular video and its sequences is replaced with an automatic process that provides the user with at least two versions of a selected music piece. Therefore, this approach delivers a functionality to the user which enables the user to swiftly create and review different versions of a selected music piece having a differing dynamic impact without the need to manually process each piece.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

Figure 1:
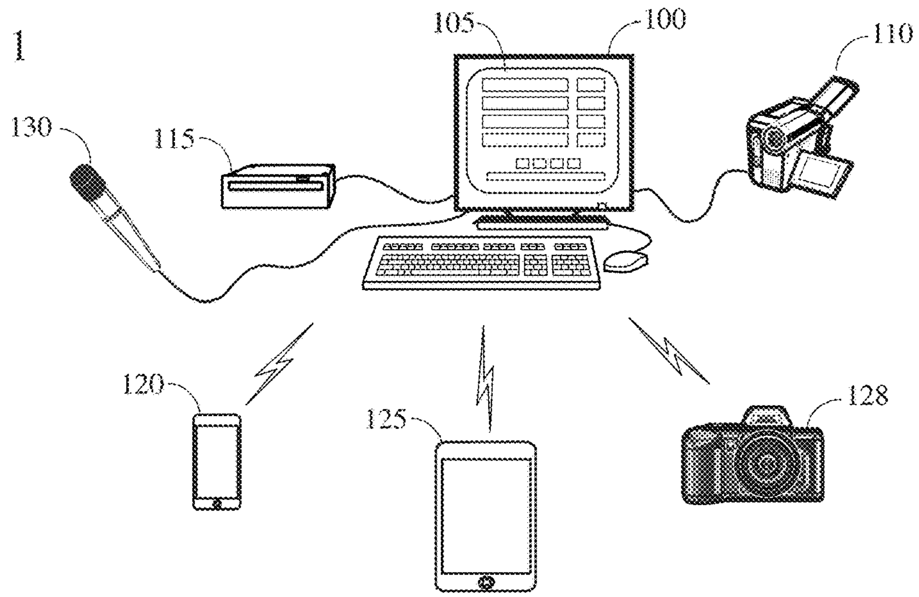
FIG. 1 is an illustration of a working environment of the instant invention according to an embodiment.

The invention will be described in connection with its preferred embodiments. However, to the extent that the following detailed description is specific to a particular embodiment or a particular use of the invention, this is intended to be illustrative only and is not construed as limiting the invention's scope. On the contrary, it is intended to cover all alternatives, modifications, and equivalents included within the invention's spirit and scope, as defined by the appended claims.

DETAILED DESCRIPTION

While this invention is susceptible of embodiments in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

As is generally indicated in FIG. 1, at least a portion of the instant invention will be implemented in form of software 105 running on a user's computer 100 or other device with a CPU such as a table computer, smart phone, etc. For purposes of the instant disclosure, the word "computer" or CPU will be used generically to refer to any programmable device such as those listed in the previous sentence. Such a computer will have some amount of program memory and storage (whether internal or accessible via a network) as is conventionally utilized by such units. Additionally, it is possible that an external camera 110 of some sort be utilized with- and will preferably be connectible to the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g., in handheld computers, cell phones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interface between it and the computer is utilized. Additionally, a microphone 130 might be utilized so that the user can add voice-over narration to a multimedia work and a digital media burning device 115 (e.g., a CD or DVD burner) or other external nonvolatile storage could be useful for storing in-progress or completed works. Further, it might also be possible and is shown in FIG. 1 that the process of the instant invention might be implemented on portable tablet computer devices 125 or on mobile devices, such as smart phones 120.

Figure 2:
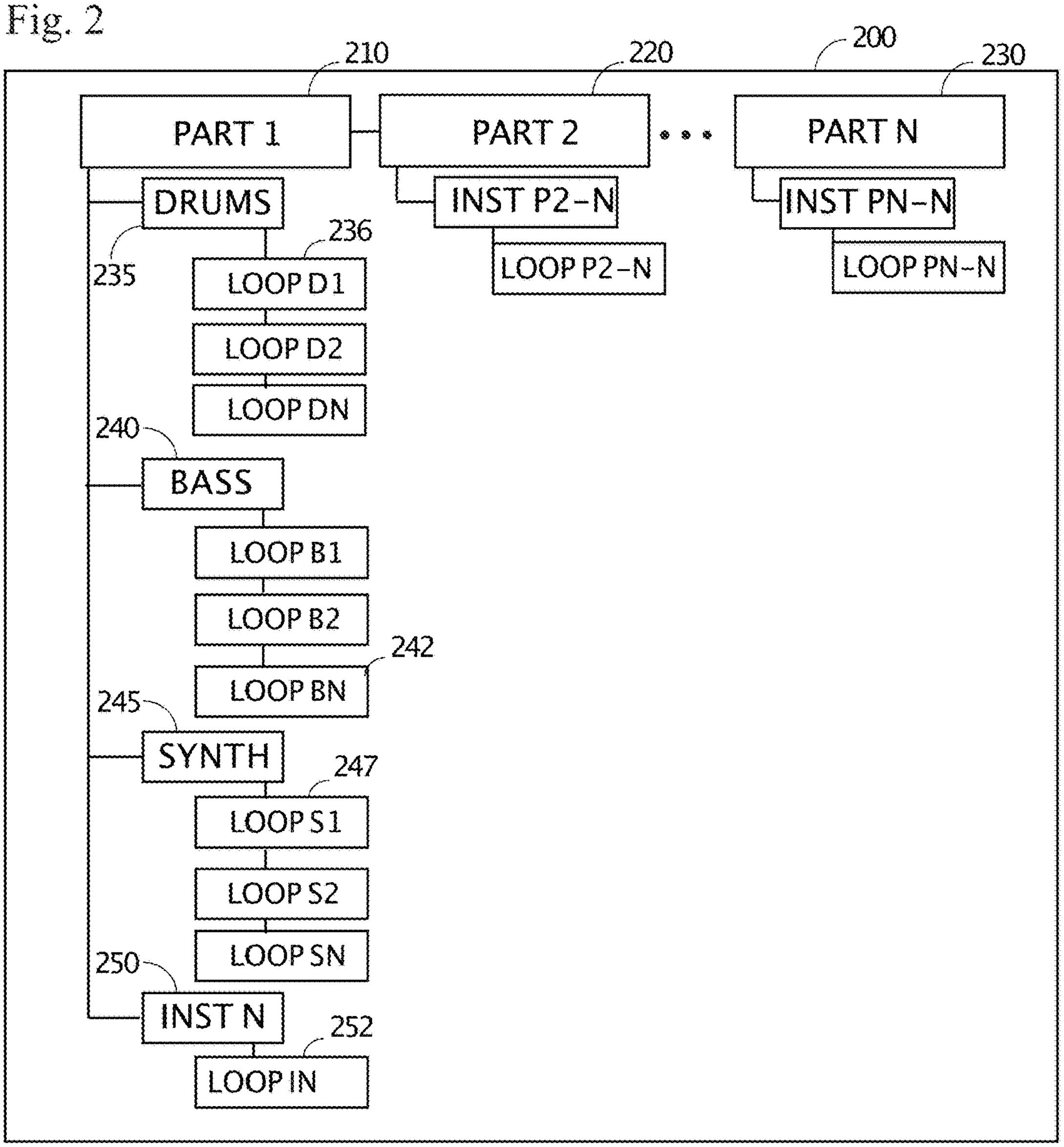
FIG. 2 depicts a general and basic structure of a song or portion of a song according to an embodiment of the instant invention.

Turning next to FIG. 2, this figure illustrates the skeletal structure of a song or a music piece 200 according to an embodiment. This structure functions as the starting point for the functionality of the instant invention. A song or music piece generated by an embodiment of the software product will consist of a plurality of individual song parts ("SP") which is illustrated by Part 1 210 and Part 2 220 in FIG. 2, where the denomination of Part N 230 is used to indicate that a potential song or music piece might consist of an arbitrary number of parts. Each part will have some number of instruments and loops associated therewith and a specified runtime at a given tempo, which might be selected and chosen by the user. Alternatively, the run time might be defined in terms of its length in measures, for example, 4 or 8 measures or multiples thereof. Additionally, these parts might be further identified by, for example, designating them as being an intro, chorus, bridge, ending, etc. FIG. 2 also generally indicates that each part of a song or music piece preferably consists of an arbitrary number of instruments. This is indicated by the label INST P2-N (i.e., the "Nth" instrument in Part 2) and LOOP P2-N (i.e., the "Nth" loop associated with Instrument P2-N), It should be noted that "N" is just a generic indicator that there may be an indeterminant number of the indicated items. It need not be the same for each instance it occurs. According to this embodiment, the audio loops that sound these instruments are accessible to the user from a pre-existing audio loop database. Of course, those of ordinary skill in the art will recognize that an audio loop is a digital file of audio material that usually may be seamlessly repeated, i.e., "looped". Further details with respect to this figure are presented below.

In FIG. 2 the instruments associated with Part 1, i.e., drums 235, bass 240 and synth 245, are given as examples only and this depiction is not intended to limit the specification of the instant invention to only that number of instruments or those variations. On the contrary it should be clear that any number of other instrument choices are certainly possible, and the use of only three instruments in this figure is only for illustrative purposes. Also INST N 250 (i.e., Instrument "N") is identified that way to illustrate that there may be an arbitrary number of instruments and/or loops associated with a part. For each of the available and potentially selected instruments, each of the audio loops is individually selectable (e.g., loops 236, 242, 247, and 252) and is played when the part 210 is selected. The selection of each audio loop is either carried out by the user manually or automatically by the instant invention.

Figure 3:
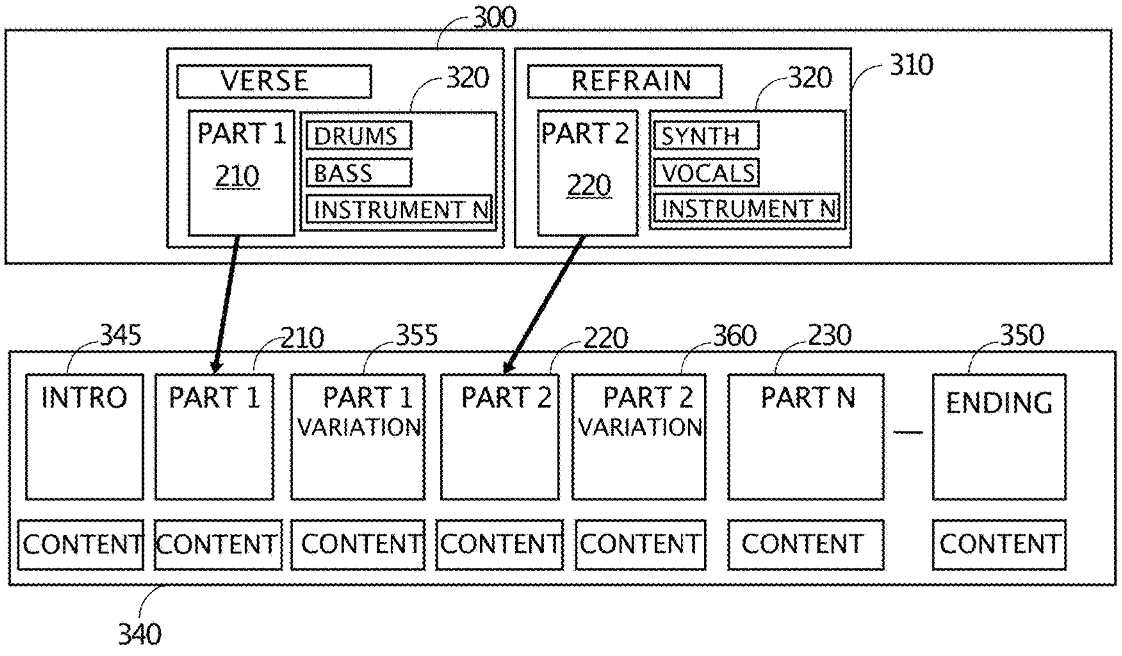
FIG. 3 illustrates a high-level view of the interaction of the parts of an embodiment.

FIG. 3 gives additional details of the layout of a song skeleton 340. In this example, a song is constructed of 8 individual sections, which might comprise an intro 345, an ending 350, all of the user supplied sections with their content 200 (e.g., FIGS. 2) and 210/220, the instruments and associated audio loops and, in this particular example, a mixture of variations of these supplied parts (355 and 360). In addition, parts might be added to the skeleton to lengthen the runtime of the work. So, in this example the song skeleton basically includes an intro and an ending and in between the user parts plus variations of these parts and new parts. Of course, other song parts might be available including, for example, a song bridge, a song refrain/chorus, pre-chorus, etc.

In one preferred arrangement the associated audio loops are played and replayed if necessary, during the whole runtime of the part to which their parent instrument belongs. However, it is also possible that the user may select and de-select (mute) or switch/replace individual audio loops during the runtime of a particular part.

The instant invention provides and utilizes an evolving and growing database of audio loops, wherein the audio loops are categorized according to one or more particular styles, for example EDM, 50*s*, Drum'n Bass, Jazz, Classical, Rock, Metal, House, etc. Each style features a plurality of different instruments in the database associated with it and each instrument has a number of associated audio loops, i.e., audio loops in which the instrument sounds when the loop is played.

Also, in some cases, the loop might not contain traditional audio recordings of an acoustic instrument but might contain computer generated sounds instead that resemble (or not) traditional instruments, e.g., synth sounds. Either way, when it is said herein that an instrument is present in a recorded loop that term should be broadly construed to cover instances where there is a digital audio recording of that instrument as well as cases where the audio material in the loop is computer or otherwise generated. The audio loop database will preferably be updated on a regular basis with new styles and the associated instruments and loops being added, existing styles with the associated instruments and loops being updated or deleted, etc. Preferably these updates will be delivered over the Internet for free or in exchange for a particular payment option.

Figure 4:
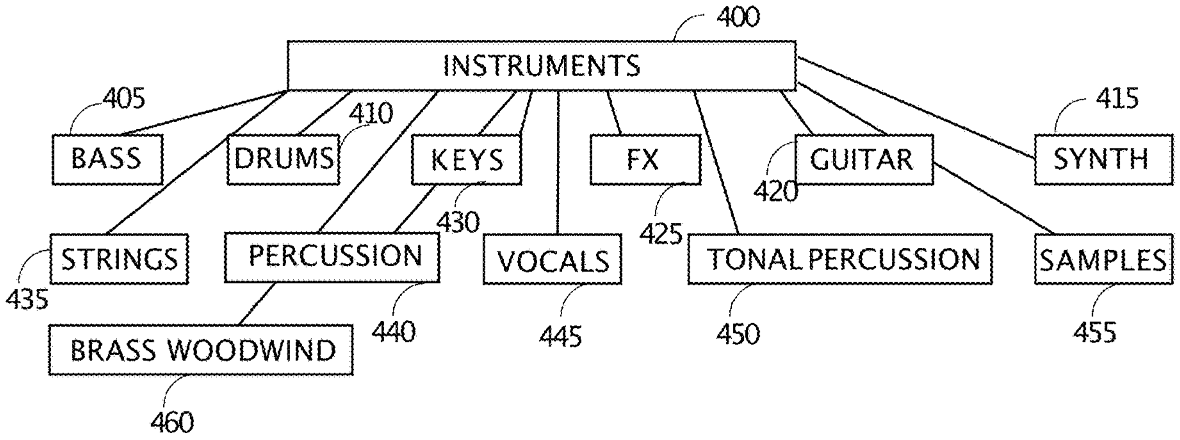
FIG. 4 depicts the structural setup of the instruments making up a song part.

Turning next to FIG. 4, this figure depicts one possible structural setup of the instruments 400 that comprise the song parts. It should be noted that the listing illustrates the number of and type of instrument channels that are preferably available in a song part, but it is also possible that song parts might contain more or fewer instrument channels. The instrument channels in this embodiment are bass 405, drums 410, keys 430, FX 425, guitar 420, synth 415, strings 435, percussion 440, vocals 445, tonal percussion 450, samples 455 and brass woodwind 460.

Figure 5:
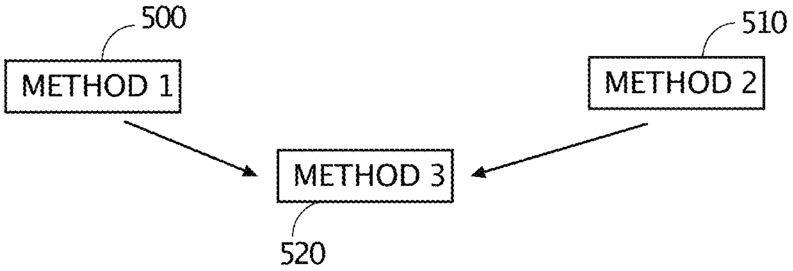
FIG. 5 illustrates a high-level representation of some of the different approaches to energy increasement of songs according to the instant invention.

Turning next to FIG. 5, this figure contains a high-level representation of some of the different approaches to energy increasement of songs according to the instant invention and some of their possible interactions/relationships. The instant invention discloses three main approaches to loop-based energy increasement. Method 1 500 utilizes a loop exchange approach to increasing energy and method 2 510 adds selected loops to the song in order to increase its energy level.

The third method, Method 3 520 is a hybrid version that is utilized if the requirements of Method 2 510 are not met. Therefore, Method 3 520 comprises a process where steps similar to method 2 510 and method 1 510 are implemented sequentially.

Figure 6:
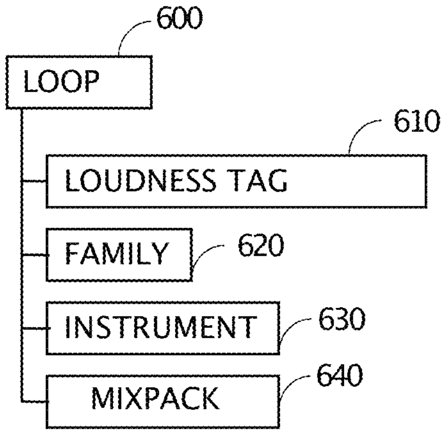
FIG. 6 discloses one possible data structure of an audio loop 600 as it is being utilized by the instant invention.

Turning next to FIG. 6, this figure discloses one possible data structure of an audio loop 600 as it is being utilized by the instant invention. Each loop 600 in the audio loop database of the instant invention contains a loudness tag 610 that represents the musical energy of that loop. Additionally, the audio loop contains a family 620 data value, wherein the family value is designed to classify audio loops that are similar in tone and musical aspects and that go with one another in some sense. The audio loop also has an instrument association 630, the association being one of either bass, drums, keys, fx, guitar, synth, strings, percussion, vocals, tonal percussion, samples, or brass woodwind. An audio loop can only be associated with one instrument. The last data value that is associated with an audio loop is the mixpack association 640, wherein a mixpack represents a collection of audio loops that in their entirety represent categories, these could be, for example, genres, time frames, moods, year, occasions and styles.

Figure 7:
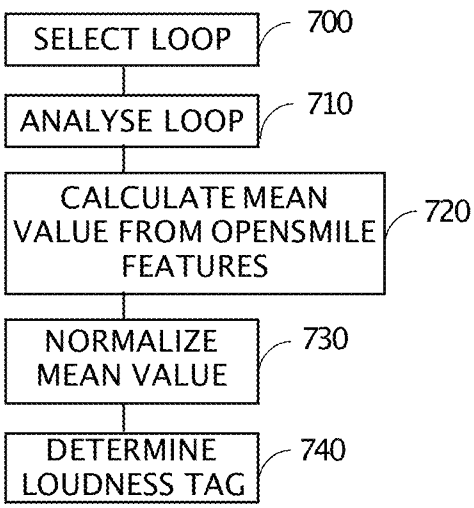
FIG. 7 discloses some important processing steps for generating a loudness tag for each audio loop stored in the audio loop database.

Coming next to FIG. 7, this figure discloses the main processing steps for generating a loudness tag for each audio loop stored in the audio loop database. One goal of this process is to quantify the energy, i.e., the musical dynamic, of each loop and additionally make the loops comparable in terms of their musical intensity. This process is preferably carried out on each audio loop when the audio loop database is initialized or when a new audio loop is being added to the database.

In a first preferred step the instant invention will select an individual audio loop 700 and will initiate an analysis 710 based on the openSMILE toolkit. That is, this analysis will implement the loudness directed analysis functionalities and features from openSMILE (open-source Speech and Music Interpretation by Large-space extraction). openSMILE is an open source toolkit for audio feature extraction and classification of speech and music signals and it is widely applied in automatic emotion recognition for affective computing. The features and functionality of this toolkit (e.g., https://en.wikipedia.org/wiki/OpenSMILE) are well known to those of ordinary skill in the art.

In a next preferred step, the instant invention will calculate a mean value from the gathered loudness features 720 obtained from the openSMILE analysis and as a next preferred step the instant invention will normalize the calculated mean to a value between, 0 and 1 (or from 0 to 100, etc.) 730 so as to generate a quantifiable value that represents each audio loop. As a last preferred step, the instant invention will use this normalized value to generate the loudness tag for each audio loop 740.

Figure 8:
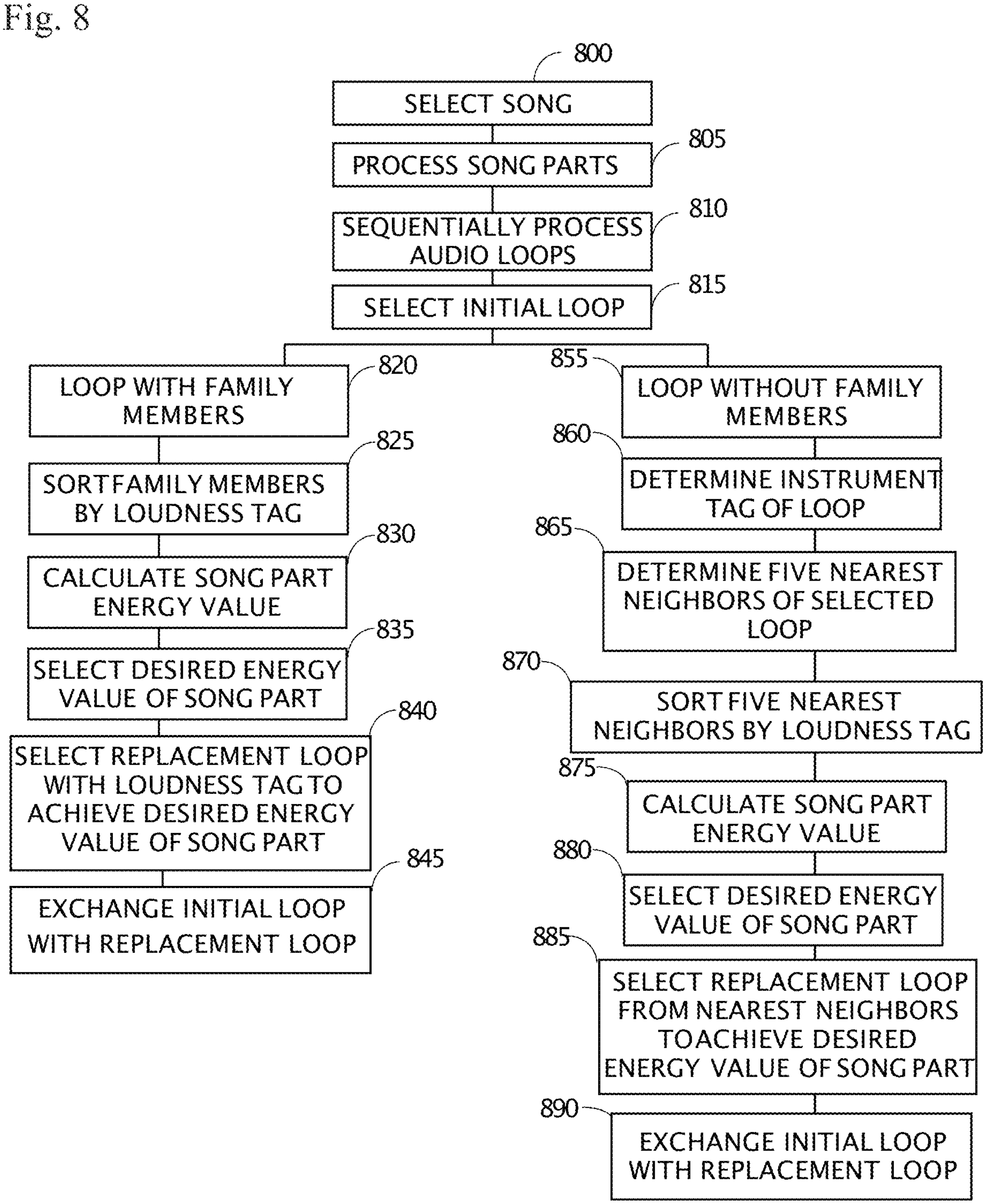
FIG. 8 depicts some processing steps associated with one approach of increasing the energy of a loop-based song.

Coming next to FIG. 8, this figure depicts the processing steps of one approach to increasing the energy of a loop-based song. In a first preferred step the user who wants to increase the energy of a song selects it 800 and the instant invention will sequentially process all of its song parts 805 that make up the song and the instant invention will in a next preferred step sequentially process all audio loops 810 of each song part. The goal of these first processing steps is to find characteristics that can be used to find compatible replacements in the database for the original loops that have a higher loudness tag value.

In a next preferred step, the instant invention will select an initial loop 815, wherein the instant invention will then determine whether the selected loop has associated family members 820 or if the loop has no associated family members 855. If the selected loop has associated family members 820 then in a next preferred step the instant invention will identify and determine an order of the family members 825 by their loudness tag values. Note that in some embodiments this step might sort the tags to create an ordered list. In other embodiments, the order might be determined without an actual sort taking place. Thus, whenever the term "sort" is used herein, that term should be broadly construed to include cases where an actual ordered list is prepared (i.e., the items are "sorted") as well as instances where an order is determined without actually sorting the items.

In a next preferred step, the instant invention will calculate a value representative of the present overall energy level of the song part 830, which is preferably determined by summing the loudness values of each audio loop in the song part 830 and dividing the sum by the number of the audio loops. The calculated value can either be displayed to the user or it could be hidden.

In a next preferred step, the instant invention will automatically select a desired energy value of the song part or will the user give the option of manually selecting the desired energy value 835. The selection of the desired energy value might be communicated using, by way of example only, a numerical selection (e.g., 1, 2, or 3, 55 out of 100, 0.3 out of 1, etc.) or clicking a program button labeled "Higher" or it might even be possible to present the user with a selection of different levels of energy associated from the different loudness tags of the family members that are being considered for inclusion in the song.

As a next preferred step, the instant invention will select a replacement loop to achieve the desired energy value or level of the song part 840 from the sorted family members. In the next preferred step, the initial loop will be exchanged with the replacement loop 845.

In the event that the initial loop has no associated family members 855, the current embodiment continues by determining the instrument tag of the selected initial loop 860. As a next preferred step, the instant invention will determine and select from the database some number, e.g., at least the five [[,] nearest neighbor loops of the selected initial loop 865. The determined nearest neighbor loops will then in a next preferred step also sorted by their loudness tags 870. As a next preferred step, the instant invention will calculate the present energy value of the song part 875, which is preferably determined by summing the loudness values of each audio loop and dividing the sum by the number of the audio loops. The calculated value can either be displayed to the user or will be hidden.

In a next preferred step for this initial loop, the instant invention will select the desired energy value of the output/modified song part or the user will be given the option of determining the desired energy value 880. The selection of the desired energy value might be by specifying a numerical value, clicking a ""higher" button, or it might even be possible to present the user with a selection of different levels of energy associated with the different loudness tags of the family members. As a next preferred step, the instant invention will select a replacement loop from the identified family members to achieve the desired energy value or level of the song part 885 at least approximately. In the next preferred step, the initial loop will be exchanged with the replacement loop 890.

Figure 9:
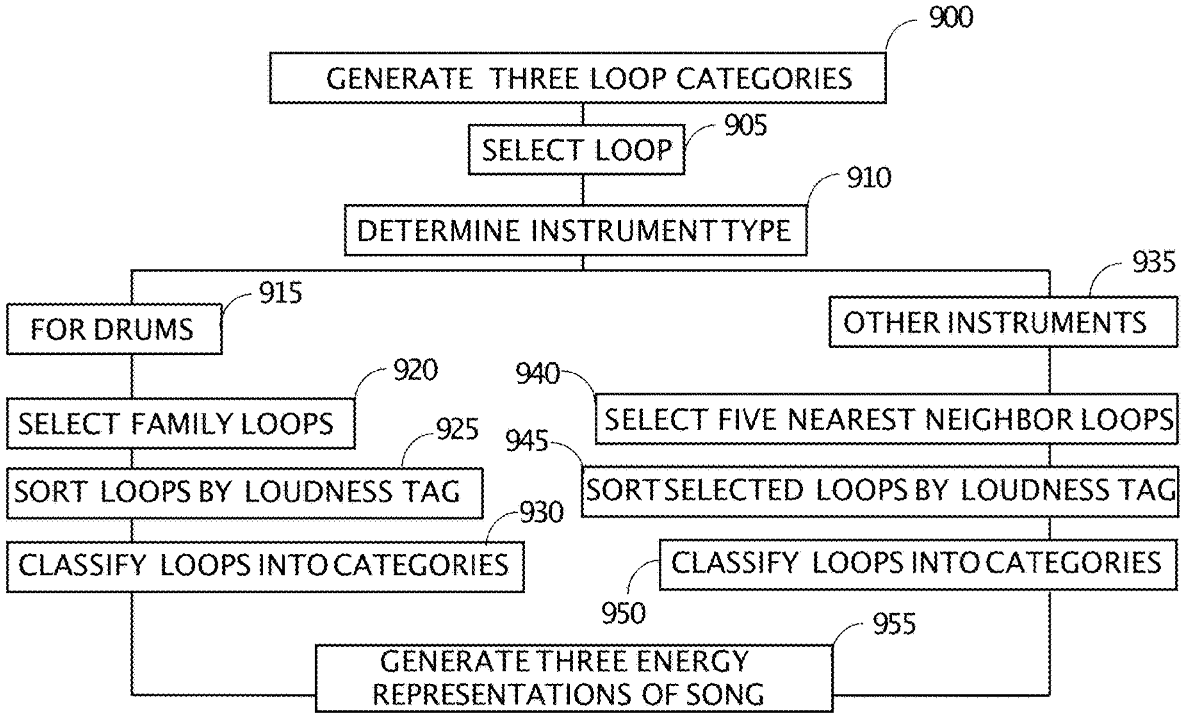
FIG. 9 illustrates one possible approach to preparing the audio loop database for application in the energy increasement modes of the instant invention for a selected song.

Turning next to FIG. 9, this figure illustrates an approach to preparing an audio loop database for application in the energy increasement modes of the instant invention for a selected song. This approach results in the potential provision of three different energy representations of the selected song which are presented to the user for selection. As a first preferred step the system will generate three different loop categories 900, these preferably being categories that are associated with the energy tag of each loop, e.g., they might be low, medium and high.

As a next preferred step each loop of the song part will be selected sequentially 905 and as a first preferred step the instrument type of the loop will be determined 910. If the instrument type is DRUMS 915 the instant invention will select all drum family loops 920 in the database and in the next preferred step the selected family loops will be sorted by their loudness tag 925. The instant invention will then analyze the sorted family loops and automatically classify each loop into the appropriate loop category 930. Preferably the loops with the lowest and highest energy will be in the categories "low" and "high", respectively. If the selected loop has the highest or lowest energy in the family then it will preferably be assigned to the highest or lowest category accordingly.

For all remaining audio loops, i.e., loops not having the drum instrument tag 935, for each loop individually, the instant invention will select, for example, the five nearest neighbor loops 940. Those of ordinary skill in the art will recognize that "nearest neighbor" is an algorithm that associates or groups entities based on some measure of their similarity. Here, one approach that has proven satisfactory is to calculate distances between loops by comparing the musical properties of each loop, e.g., grouping them based on their loudness tags 945. The sorted loops will then be classified into the selected categories in the same way the audio loops with the drums instrument type were classified previously. As a result, the instant invention can provide the user three dynamic selectable versions of the song, with each of the three versions having a different energy level 955.

Figure 10:
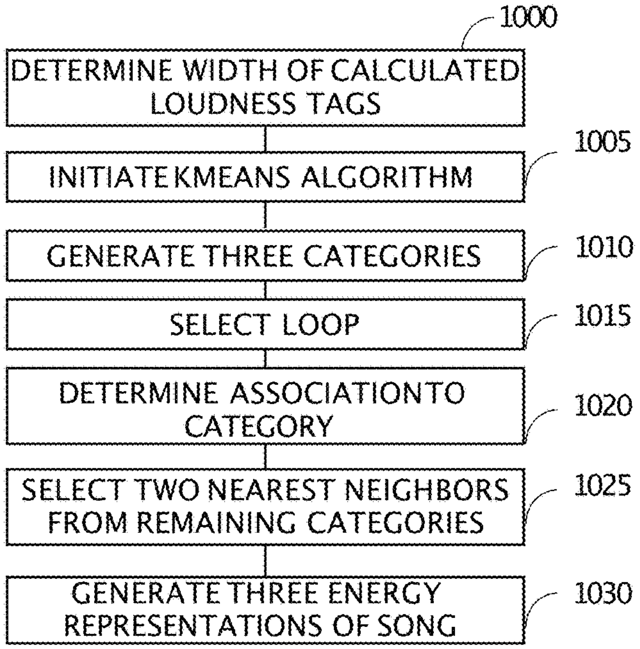
FIG. 10 depicts another potential approach to preparing the audio loop database for application in the energy increasement modes of the instant invention for a selected song.

Turning next to FIG. 10, this figure depicts another preferred approach to preparing the audio loop database for application in the energy increasement modes of the instant invention. In this variation the final step is that the user will be provided with a selection of three different energy representations of the selected song.

As a first preferred step the instant invention will select the loudness tags of all of the loops in the database 1000. In the next preferred step, a kMeans clustering algorithm will be applied 1005 to the collection of calculated loudness tags to identify three different categories 1010, these categories preferably will be associated with low, medium or high loudness. For each loop 1015 that is a part of the song part the instant invention will then decide into which of the kMeans categories the loop belongs 1020. From this association the instant invention will select two nearest neighbors from the two remaining categories 1025. As a result, the instant invention will be able to provide the user with three dynamic selectable versions of the song, where the three versions feature three different energy levels 1030.

Figure 11:
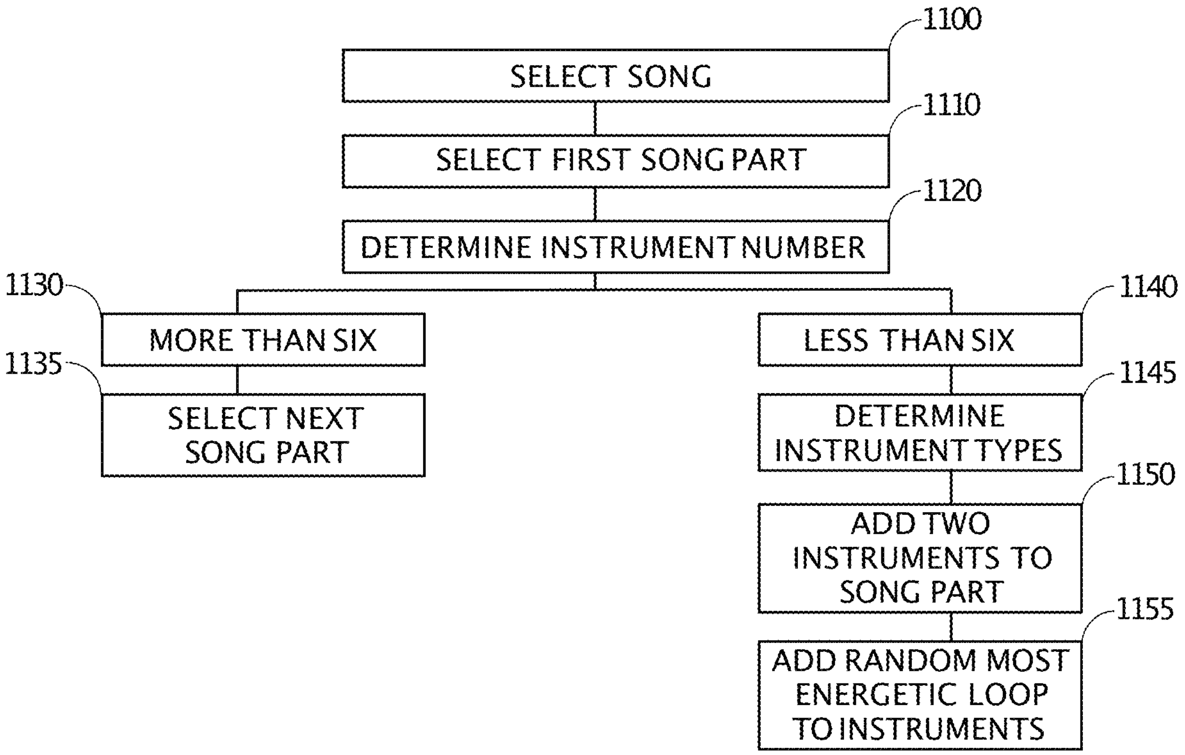
FIG. 11 illustrates the preferred processing steps of another approach of increasing the energy of a loop-based song.

Turning next to FIG. 11, this figure illustrates the processing steps of another embodiment. In this approach the energy, i.e., the musical dynamic of the song, will be increased by adding additional audio loops to one or more song parts. In a first preferred step the user who wishes to increase the energy will select a song 1100. As a next preferred step, the instant invention will select the first song part of the selected song 1110. Next, the number of instruments in that particular selected song part 1120 will be determined. In this variation, if more than six instruments 1130 are included in that song part the instant invention will then move to the next song part 1135. In case that there are fewer than six instruments 1140, the instant invention will, in a next preferred step, determine the instrument types 1145 that are included in the selected song part with the intention of adding at least two instruments to the song part 1150 and, preferably, chosen randomly (as that term is defined below) from the most energetic loops for that particular instrument 1155.

For example, suppose for purposes of illustration that the first song part is missing a Bass and Synth instrument loop, so a random Bass and Synth loop will be added to that song part. Note that for purposes of the instant disclosure, the term random in this context should be construed to mean that the instant invention will determine the, say, 30% most energetic loops of this instrument type as stored in the audio loop database and then select one loop randomly from the determined 30%. To determine the energy, the instant invention utilizes the loudness tag stored with each audio loop. This process is then repeated for each song part that makes up the song. That is, each loop that is added is selected using a nearest neighbor algorithm. To continue with the current example, suppose the second song part is missing Synth and FX. Into the Synth instrument section the instant invention will then add a loop that has been selected by the nearest neighbor algorithm using the added audio loop from the Synth section in the first song part as the starter loop for the nearest neighbor selection. For the FX instrument section that is newly added one of the, say, 30% most energetic loops from this instrument is randomly added.

Figure 12:
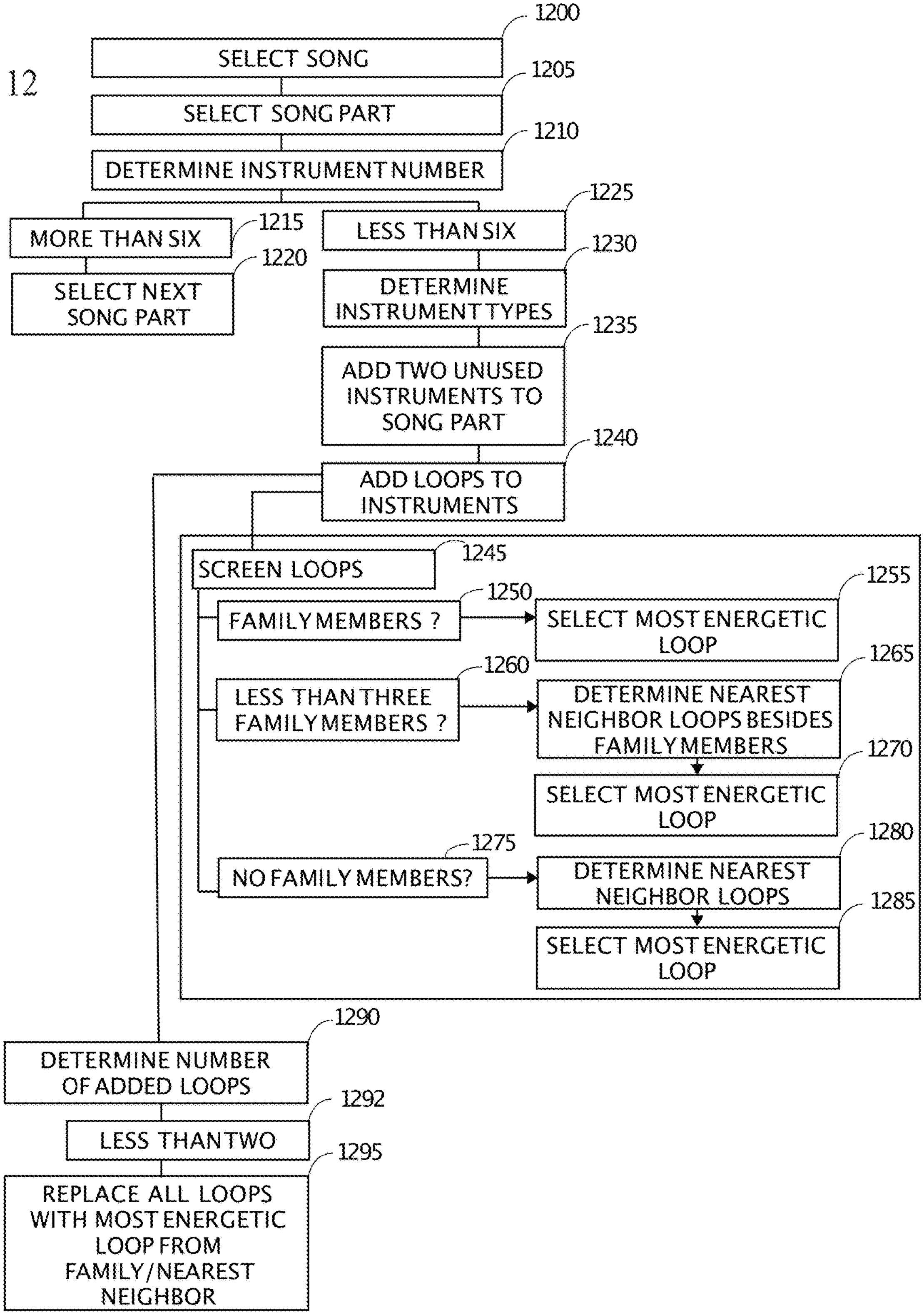
FIG. 12 illustrates a third approach to increasing the energy of a loop-based song which comprises a mixture of the functionalities of the previously disclosed energy increase approaches.

Coming next to FIG. 12, this figure illustrates a third approach to increasing the energy of a loop-based song. This embodiment represents a mixture of the functionalities of the previously disclosed energy increase approaches. As can be seen from this figure this approach is initiated by a user by selecting a song 1200 that he or she would like to increase energy-wise. In this variation the instant invention proceeds through the selected song sequentially, i.e., each song part is processed successively beginning with the first one. Therefore, as a next preferred step the instant invention selects the next song part 1205. As a next preferred step, the instant invention will then determine the instrument number 1210 in that selected part. If more than six instruments 1215 are already present in this particular song part, the instant invention will move to the next song part 1220.

If fewer than six instruments are in this particular song part 1225, then the instant invention will add audio loops of at least two unused instruments 1235 to this part. In this embodiment, the instant invention will proceed according to this ordered list: Drums, Bass, Synth, Guitar, Brass Woodwind, Percussion, FX, Samples. As a next preferred step, the instant invention will begin to add loops to the added instrument sections 1240. The loop selection process will undergo a particular screening process 1245 wherein in a first preferred step the audio loop database will be screened to determine if there are loops with a family association stored for the added instruments 1250. If that is the case the instant invention will select the most energetic loop, i.e., the loop with the highest loudness tag 1255 for insertion.

If there are fewer than three family members 1260 stored in the database then the instant invention will also use nearest neighbor loops in addition to the family members 1265 for loop selection and from that list the instant invention will select the most energetic loop, i.e. the loop with the highest loudness tag 1270 for insertion. If no family members are stored in the database, then the instant invention will use the nearest neighbor algorithm 1280 to select the most energetic replacement loop, i.e., the loop with the highest loudness tag 1285 from the complete audio loop database, for insertion.

It should be noted that this screening process preferably differs when selecting new loops for later parts of the selected song. If a previously processed part has a particular instrument and an associated loop has been added for the selection process, the instant invention will add a new loop depending on the contents of the previous song part. For example: suppose that a first song part is missing Guitar and Brass Woodwind. In that case, the algorithm adds a random and preferably the most energetic Guitar loop and Brass Woodwind loop to the song part and then ends processing of this song part and proceeds to the next one. For purposes of illustration only, assume that the following song partis missing Brass Woodwind and FX. The algorithm adds Brass Woodwind and FX instruments, but for the Brass Woodwind instrument the screening process is carried out using the to Brass Woodwind loop added to the previous song part as the starter loop. By way of explanation, in this case a Brass Woodwind loop was added to the current song part (Song Part 1). Rather than add the same loop to the next song part (Song Part 2), the loop added to Song Part 1 will serve as a starter for use in determining which loop should be added to the Song Part 2. This way the instant approach keeps the same loop from being added to multiple adjacent song parts. But by using the previous loop as a starter for selection of the next loop some amount of musical continuity may be obtained. For the new added FX instrument the random most energetic loop is added.

After the loops for the added instruments have been determined and added to the instruments 1240, the instant invention will determine the total number of all loops added to the currently processed song part 1290. If that determination indicates that fewer than two audio loops 1292 have been added to this part, the algorithm will, in a next preferred step, replace all loops in this part with the most energetic loops from the family/nearest neighbor combination 1295. If two or more than two audio loops have been added, then the instant invention will proceed to the next song part.

According to one embodiment, there is provided a processing flow as follows when searching for higher energy loops. Typically, two steps are performed:

1. Check if loop is part of a loop family. If it is then select the family member with the highest energy
   If not, search in the same mixpack/instrument folder for higher energy loops, where the term "mixpack" refers to a collection of audio loops sorted by categories. For example, the categories might include the genre of the loop, era, band, etc.
   Create song versions with lower/higher energy level depending on the choice(s) of the user.
   Optionally use harmony templates to define the energy level of song parts and fill them with appropriate loops.
   Use the loudness features from openSMILE, potentially with additional features that describe the brightness of the sound, and calculate the mean to represent a loop with a single value. Normalize the number between 0 and 1 (or from 0 to 100, etc.) to quantify the energy of each loop. Note that openSMILE (i.e., open-source Speech and Music Interpretation by Large-space Extraction) is an open-source toolkit for audio feature extraction and classification of speech and music signals. The tool kit is widely applied in automatic emotion recognition for affective computing.

Check to see if a selected loop has a family member:
   If so, then prioritize these family members as the nearest neighbors. (In most cases, the loop will have one or more family members).
   Sort the family members by energy, replace the selected loop with a family member depending on the energy we want to achieve for the current SP, i.e., the total energy of a SP (i.e., "Song Part") is calculated as SP_energy=Sum_loop_energies/num_loops=0.7.

If increasing the energy to 0.8 is desired then replace the selected loop with a loop of energy x in order to achieve 0.8 in the same way as was done previously or just add a loop to increase the calculated SP energy up to 0.8. Preferably this will be a loop from an instrument category that is not present in the SP.
   This can also be done based on levels or categories of energy level instead of being based on a continuous number. For example, the presentation to the user might be in terms of discrete categories so that the user might select an "energy level 5" wherein then family member with level 5 would be selected and the underlying data/values would be integrated to generate an output song with the desired energy level.

"If "no", i.e., the selected loop does not have a family member, then select the 5 nearest neighbors that belong to the SAME instrument tag as the loop that is to be replaced and sort them by energy. Repeat the same process as before, depending on the desired energy level on the SP.

Note that if there are no tags for a specific mixpack then folder names could be used instead.

In the case where 5 nearest neighbors are determined and then sorted by energy, it would be possible to suggest that the user chooses between the 5 energy levels (e.g., 5 neighbors sorted by energy without the user knowing it) from low to high.

Regarding the energy templates, songs can be created using commercially available software packages that offer features such as creation of audio files/songs and mixpacks, each representing a specific energy level (or energy fluctuation pattern across time). Then, by calculating energy per SP (and per instrument tag within a SP), a template per energy values can be specified, i.e., SP_1_energy=0.2, SP_2_energy=0.5, etc. Using this template we can potentially transform any song project to the desired energy behavior.

Similarities in terms of energy between the different songs that are to be utilized as soundtracks can be used to suggest soundtracks to the user that have similar energy levels. Or it can be used as an additional step in the similarity determination (to suggest similar soundtracks to the user. This might be useful in addition to the tags that are already available.

A brief description of how the aforementioned embodiments can be utilized in different ways are presented below.

1st approach: 3 loop buckets=LOW, MID & and HIGH energy.

For each loop in the project to be replaced check the following:
   If the loop has family loops (only for DRUMS): Don't limit the search to neighbors but sort all family loops by energy. Then decide which one should be classified into which energy bucket. It would be more efficient to not select the previous and next loop in the energy order for the 2 energy versions but rather the lowest and highest energy in the loop family. If the original loop has the highest or lowest energy in the family then it should be associated with the highest or lowest energy bucket accordingly.
   If not, i.e., the loop does not have family loops, find the 2 nearest neighbors (so a pool of 3 loops in total are obtained, i.e., the query plus 2 neighbors) and sort them by energy to define 3 energy levels again. Try a number larger than 2 NNs because it limits the energy variation (e.g., try 5). Define which loop of these is associated with which energy level (low/mid/high) and associate each loop with the correct bucket.

At the end of this iterative process, there will be 3 buckets=LOW, MID and HIGH energy which are the 3 energy representations of the XML project, i.e., a song structure that is available as the result of the song generation process.

Remarks: The previous approach demonstrated that less effective results would be expected if we only use the MP (i.e., mixpack) used in the demo song (so there is only one mixpack), as it also limits the nearest neighbor selection and the variation approach. It's better to utilize the instant invention in a larger collection of mixpacks or even genres. Note that in some cases the selected loops will be duplicates. One way to solve this issue, assuming it needs to be solved, is to select the next loop in the queue.

2nd approach: According to another embodiment, all of the loudness features from all of the loops in the database will be used to perform a kMeans clustering algorithm to identify three different clusters. For each loop that is to be replaced the following will be checked:
   Determine in which of the three energy clusters it belongs: low, mid, or high energy.
   Based on this finding, from each of the other two remaining clusters find the loop's closest neighbor and that should be the loop's "energy" representation from the other two energy levels. If it has family loops, consider these loops as its closest neighbors, and find the clusters in which they belong. The purpose here is to find loops closest to the query loop, but belonging in clusters other than the one the query loop belongs to.

Repeat this process for all loops in the XML project. This should conclude in 3 energy level representations for the XML project, Energy Levels 2. Increase the song energy with additional loops. According to another embodiment the following will be performed:

Add random unused loops of the same mixpacks to the song part to increase perceptual energy. In this case, "random loop" means-find the most energetic 30% of loops of an instrument folder. Then select a random loop or loops out of this collection of loops.

Example #1

For the first song part of a song:

If more than 6 instruments are used in the song part, no additional loops should be added Else: add random loops of 2 instruments unused in the song part, Search for these instruments in the following order:

DRUMS, BASS, SYNTH, GUITAR, BRASS WOODWIND, PERCUSSION, FX, SAMPLES,

Example #2

The first song part is missing BASS and SYNTH, so random BASS and SYNTH loops of the mixpacks of the song are added.

For the following song part in the music work:

use the same algorithm, but for loop selection in the new instruments use nearest neighbor algorithm.

Example #3

The second song part (i.e., song part 2) is missing SYNTH and FX. So for adding SYNTH, the nearest neighbor SYNTH from SPI song part 1 is added, For FX a random loop is added.

Energy Levels 3 "Hybrid". This is a combination of methods 1 and 2. Here is one general approach. If possible, the energy level should be increased by adding loops of unused instruments in each song part, e.g., see Energy Level 2. But in some cases, this will not be possible, e.g., if no unused instruments are in the used mixpack(s).

If this is the case Energy Levels 1 should be used, replacing (some) loops with higher energy versions.

To maintain consistency only these loops should be replaced by a more energetic one where the difference in loudness is "significant" in some sense, e.g., in an auditory or statistical sense. Implemented in one embodiment as follows:

Step 1—Check the current instrument in a song part. If more than 6 instruments are used in the part no additional loops should be added. Otherwise, add loops of two unused instruments in this part according to this ordered list: DRUMS, BASS, SYNTH, GUITAR, BRASS WOODWIND, PERCUSSION, FX, SAMPLES. If the previous part has needed an instrument, the algorithm will add its neighbor/family to the instrument that was added.

If the loop of the needed instrument has family members, the algorithm will use them for selecting a loop. But if the loop has less than 3 family member loops, the algorithm will also use nearest neighbor loops of the current loop for loop selection. If the loop does not have family loops, the algorithm will use its nearest neighbor loops. The algorithm will select the most energetic loop within a given pool of loops.

Otherwise, the algorithm will sort all of the loops associated with a needed instrument and choose the most energetic loop.

Step 2—Check added loops to a part. If fewer than two loops are added to this part, the algorithm will revert to Step 1 and replace all loops in this part with most energetic loop of their neighbors/families.

Variation of the "Hybrid" version:

In this embodiment, the add/remove loops concept should still be considered for use because it allows switching between energy versions at any time without discontinuity and there are some additional adjustments in this approach:

The add/remove functionality is always applied, without the restriction of two loops or more missing (on the high energy algorithm).

In case of addition to increase energy, an instrument that is missing would be added that also fits with the rest loops in the part and also is the most energetic one from the ones that are to be selected. Finding the nearest neighbor and the highest energy loops can be implemented exactly as in algorithm 1 (e.g., find 7 nearest neighbors and sort by energy. If the target loop is DRUMS then only look for families and so on).

On the other hand, to remove a loop in order to reduce the energy, the loop with the highest energy (based on the instrument tag that is desired) of all in that part would be removed.

In both cases, that would make sure that the most prominent energy differences possible in both low and high energy versions are selected.

Removing DRUMS is a special case and, of course, that reduces the energy. However, it depends on what the goal is. For example, it really may not make sense to remove DRUMS from an EDM song, but rather use the drum loops with the lowest energy.

CONCLUSIONS

Of course, many modifications and extensions could be made to the instant invention by those of ordinary skill in the art. For example, in one preferred embodiment the algorithm could potentially also be utilized to remove individual audio loops or even instruments wherein the selection parameters for the audio loops would be reversed (low vice/versa high).

It should be noted and understood that the invention is described herein with a certain degree of particularity. However, the invention is not limited to the embodiment(s) set for herein for purposes of exemplification, but is limited only by the scope of the attached claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

The singular shall include the plural and vice versa unless the context in which the term appears indicates otherwise.

If the specification or claims refer to "an additional" element, that does not preclude there being more than one of the additional elements.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)–(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of automatically increasing an energy level in a music work comprised of a plurality of song parts, each of said plurality of song parts containing two or more audio loops, each of said audio loops having at least a loudness tag, a family association, and an instrument tag associated therewith, and wherein is provided an audio loop database comprised of a plurality of database audio loops, each of said database audio loops having at least a loudness tag, a family tag, and an instrument tag associated therewith, comprising the steps of:

(a) selecting a first or next one of said plurality of song parts in the music work;

(b) selecting a first or next one of said two or more audio loops of said selected song part;

(c) identifying any audio loops in said audio loop database having a same family tag as said selected audio loop, said identified any audio loops comprising members of a family;

(d) if a number of said identified any audio loops is one or more, (d1) choosing one or more of said identified any audio loops, (d2) reading a loudness tag value associated with each of said chosen one or more audio loops, (d3) sorting said chosen one or more audio loops by said read loudness tag values, (d4) calculating a current energy value of said selected song part, (d5) determining a desired energy value of said selected song part, (d6) selecting from among said chosen one or more audio loops a replacement audio loop having a loudness tag value commensurate with said desired energy value of said selected song part, and (d7) replacing in said selected song part said selected audio loop with said selected replacement audio loop;

(e) if said number of said identified any audio loops is zero, (e1) determining an instrument tag of said selected audio loop, (e2) determining in said audio database five nearest neighbor audio loops of said selected audio loop, (e3) identifying a loudness tag associated with each of said five nearest neighbor audio loops, (e4) sorting said five nearest neighbor audio loops based on said identified loudness tags associated therewith, (e5) calculating a current energy value of said selected song part, (e6) determining a desired energy value of said selected song part, (e7) selecting a replacement audio loop from among said five nearest neighbor audio loops having a loudness tag value commensurate with said desired energy value of said selected song part, and (e8) replacing in said selected song part said selected audio loop with said selected replacement audio loop;

(f) performing either step (d) or step (e) for each of said two or more audio loops of said selected song part; and (g) performing at least steps (b) through (f) for each of said song parts in said music work, thereby automatically increasing the energy level in said music work.

2. A method of automatically increasing an energy level in a music work comprised of a plurality of song parts, each of said plurality of song parts containing two or more audio loops, each of said audio loops having at least a loudness tag, a family association, and an instrument tag associated therewith, and wherein is provided an audio loop database comprised of a plurality of database audio loops, each of said database audio loops having at least a loudness tag, a family tag, and an instrument tag associated therewith, comprising the steps of:

(a) selecting a first or next one of said plurality of song parts of said music work;

(b) determining a number of instruments associated with said selected song part;

(c) only if said number of instruments is less than six, (c1) using said instrument tags associated with each of said two or more audio loops to determine a loop instrument type for each of said two or more audio loops, (c2) selecting according to an ordered list two instrument types different from any of said loop instrument types associated with said two or more audio loops, (c3) for a first of said two selected instrument types, determining a number of audio loops in said audio loop database having a same instrument type as said first of said two selected instrument types, (c4) if said number of audio loops in said audio loop database having said same instrument type as said first of said two selected instrument types is zero, (c4a) using a nearest neighbor algorithm to select a plurality of candidate loops from said audio loop database near a selected first instrument loop, (c4b) selecting as a first supplemental loop a most energetic loop among said selected plurality of candidate loops, and (c4c) adding said first supplemental loop to said selected song part, (c5) if said number of audio loops in said audio loop database having said same instrument type as said first of said two selected instrument types is one or two, (c5a) using a nearest neighbor algorithm to select a plurality of candidate loops from said audio loop database near said selected first instrument loop, (c5b) selecting as said first supplemental loop a most energetic loop among said selected plurality of candidate loops and a first instrument loop family members, and, (c5c) adding said first supplemental loop to said selected song part, (c6) if said number of audio loops in said audio loop database having said same instrument type as said first of said two selected instrument types is three or more, (c6a) selecting as said first supplemental loop a most energetic loop among said three or more audio loops in said audio loop database having said same instrument type as said first of said two selected instrument types, and (c6b) adding said first supplemental loop to said selected song part, (c7) for a second of said two selected instrument types, determining a number of audio loops in said audio loop database having a same instrument type as said second of said two selected instrument types, (c8) if said number of audio loops in said audio loop database having said same instrument type as a said second of said two selected instrument types is zero, (c8a) using a nearest neighbor algorithm to select a plurality of candidate loops from said audio loop database near said selected second instrument loop, (c8b) selecting as a second supplemental loop a most energetic loop among said selected plurality of candidate loops, and (c8c) adding said second supplemental loop to said selected song part, (c9) if said number of audio loops in said audio loop database having said same instrument type as said second of said two selected instrument types is one or two, (c9a) using a nearest neighbor algorithm to select a plurality of candidate loops from said audio loop database near said selected second instrument loop, (c9b) selecting as said second supplemental loop a most energetic loop among said selected plurality of candidate loops and said second instrument loop family members, and (c9c) adding said second supplemental loop to said selected song part, and (c10) if said number of audio loops in said audio loop database having said same instrument type as said second of said two selected instrument types is three or more, (c10a) selecting as said second supplemental loop a most energetic loop among said audio loops in said audio loop database having said same instrument type as said second of said two selected instrument types, and (c10b) adding said second supplemental loop to said selected song part;

(d) if said number of instruments is greater than or equal to six, (d1) using a nearest neighbor algorithm to select a plurality of candidate loops from said audio loop database near a supplemental loop, and (d2) replacing all of said audio loops associated with said selected song part with a same number of most energetic loops from said selected plurality of candidate loops (e) performing at least steps (a) through (d) for each of said plurality of song parts associated with said music work, thereby increasing said energy level of said music work.

3. The method according to claim 2, wherein said ordered list of instrument types comprises a drum instrument type, a bass instrument type, a synth instrument type, a guitar instrument type, a brass woodwind instrument type, a percussion instrument type, an FX instrument type, and a sample instrument type, and wherein said drum instrument type is first selected and said sample instrument type is last selected.

* * * * *